United States Patent [19]

Seiji et al.

[11] Patent Number: 4,613,205

[45] Date of Patent: Sep. 23, 1986

[54] IMAGE FIBER AND METHOD OF FABRICATING BASE MATERIAL FOR THE SAME

[75] Inventors: Shibuya Seiji; Satoh Tuguo; Komatsu Wataru; Shimuzu Takeo, all of Tokyo, Japan

[73] Assignee: Furukawa Electric Co., Ltd., Tokyo, Japan

[21] Appl. No.: 520,340

[22] Filed: Aug. 4, 1983

[30] Foreign Application Priority Data

Aug. 6, 1982 [JP] Japan .................................. 57-137083

[51] Int. Cl.⁴ .............................................. G02B 6/06
[52] U.S. Cl. .................................................. 350/96.25
[58] Field of Search ................. 350/96.24, 96.25, 96.23

[56] References Cited

U.S. PATENT DOCUMENTS 3,190,735  6/1965  Kapany .......................... 350/96.24 X

FOREIGN PATENT DOCUMENTS 0158307 12/1981 Japan ................................. 350/96.25
0048004  3/1983 Japan ................................. 350/96.24
2079741  1/1982 United Kingdom ............. 350/96.24

*Primary Examiner*—James W. Davie
*Assistant Examiner*—Lester Rushin
*Attorney, Agent, or Firm*—George B. Oujevolk

[57] ABSTRACT

A method of fabricating an image fiber base material having a number of longitudinally drawn and aligned state optical fiber strands comprising the steps of assembling optical fiber strands of more than two different diameters. This eliminates the drawbacks of the conventional image fiber by arranging the cores at random and can reduce a moire produced when connecting to a TV camera, and does not produce dislocations or pinholes of core arrangement in the image fiber since a number of cores of the image fiber are arranged at random and are covered with an integrated cladding.

4 Claims, 6 Drawing Figures

IMAGE FIBER AND METHOD OF FABRICATING BASE MATERIAL FOR THE SAME

BACKGROUND OF THE INVENTION

This invention relates to an image fiber used to transmit an image and a method of fabricating a base material for the image fiber.

An image fiber, which is also called "an image guide", is so constructed that the number of cores is densely arranged by suppressing the irregularity in the diameter as much as possible. The image fiber further prevents light from leaking by increasing the diameter of the core and the thickness of the cladding.

Two conventional representative examples of a method of fabricating an image fiber will be described. One of them includes the steps of arranging, as shown in FIG. 1, several thousands to several ten thousands of optical fiber strands 1, 1, 1, . . . (each strand having an inner core) of the same diameter so as to externally contact each other in case of filling the strands in a pipe of the same material as the strands, filling the strands thus arranged in the pipe, and then simultaneously drawing the strands 1, 1, 1, . . . together with the pipe under heated, thereby melting and integrating the strands. The other method includes the steps of filling optical fiber strands 1, 1, 1, . . . in a pipe, arranging the strands by a water stream or a supersonic vibration, and then simultaneously drawing the strands 1, 1, 1, . . . in the same manner as the first method.

FIG. 2 shows the strand filling state of the image fiber produced according to the foregoing methods. As is obvious in FIG. 2, when the strands 1, 1, 1, . . . are filled in the pipe 2 of quartz, air gap S is formed between the strands 1, 1, 1, . . . and the pipe 2.

When the image fiber of this state is collapsed or is directly drawn, the pipe 2 is reduced in its diameter, the pipe reducing force is applied only to the partial strands 1a, 1a in contact with the pipe 2 at the time of initially reducing the pipe 2. Accordingly, the arrangement of the strands 1, 1, 1, . . . is disorderly.

In this case, since the filling density of the strands 1, 1, 1, . . . is high and the arranging state is very stabilized, a great disorder of the arrangement does not occur, but as shown in FIG. 3, the arrangement is partially displaced, and cracked disorders (a dislocation of arrangement) 4, 4, 4, . . . occur among the arranging regions 3, 3, 3, . . . .

In the case of the image fiber thus obtained, the dislocations of the arrangement of the strands not only become an obstacle to the observation of the arrangement, but also cause a partial decrease in the quality of an image and, since the image fiber is formed in an arranging pattern, a moire occurs in the case that the image fiber is connected to a TV camera.

As is known, a moire occurs when the array of picture elements substantially coincides with the space frequency of a TV scanning line.

SUMMARY OF THE INVENTION

Accordingly, a primary object of this invention is to provide an image fiber which can eliminate the drawbacks of the conventional image fiber by arranging cores at random and can reduce a moire produced in the case of connecting to a TV camera.

Another object of the present invention is to provide an image fiber in which a visual disorder with dislocations of the arrangement of cores does not occur with the result that, even if small, a disorder occurs between the adjacent optical fiber strands arranged at random, the strands are rearranged in a new non-uniform random arrangement.

Still another object of the present invention is to provide a method of fabricating an image fiber which does not produce dislocations or pinholes of core arrangement in the section of the image fiber since a number of cores of the image fiber are arranged at random and are covered with an integrated cladding.

Still another object of the invention is to provide a method of fabricating an image fiber in which a picture of good contrast can be obtained due to the reduction in the leakage of light, a uniform quality of picture can be obtained by the random arrangement of the cores, and a moire does not occur even at the connection to a TV camera.

The above and other related objects and features of the invention will be apparent from a reading of the following description of the disclosure and the accompanying drawing and the novelty thereof pointed out in the appended claims.

DESCRIPTION OF THE PREFERRED EMBODIMENTS

The present invention will now be described in more detail with reference to the accompanying drawings.

Figure 1:
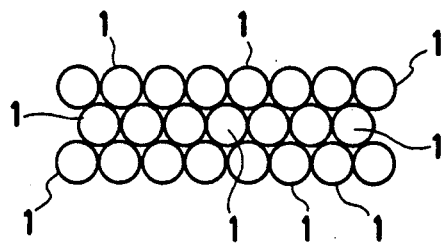
FIG. 1 is an explanatory view showing the array of conventional optical fiber strands.
Figure 2:
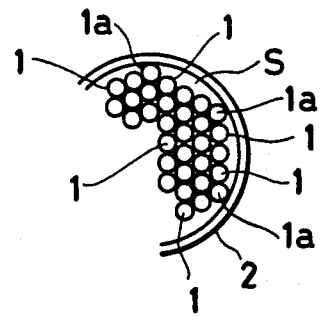
FIG. 2 is a sectional view of a base material for the conventional image fiber.
Figure 3:
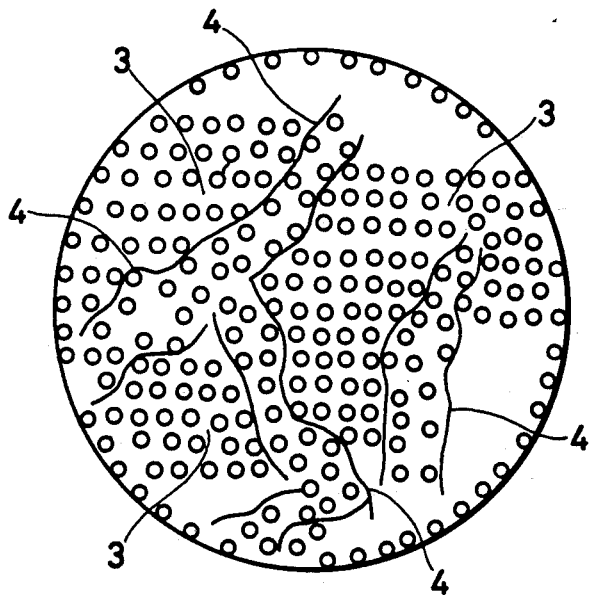
FIG. 3 is a sectional view of an image fiber obtained from the base material.
Figure 4:
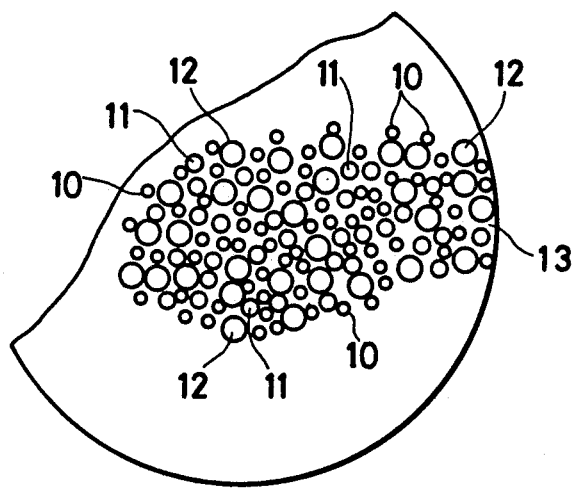
FIG. 4 is a sectional view of an embodiment of an image fiber according to the present invention.

In FIG. 4, which shows an embodiment of an image fiber according to the present invention, an image fiber comprises cores 10, 10, 10, . . . , 11, 11, 11, . . . , 12, 12, 12, . . . , and a cladding 13 for covering the cores 10, 10, 10, . . . , 11, 11, 11, . . . , and 12, 12, 12, . . . . The cores 10, 11, 12 are arranged at random in the section, and are not isolated at each core, but are integrated. Further, the diameters of the cores 10, 11, 12 are formed differently in the relationship of $10 < 11 < 12$.

Figure 5:
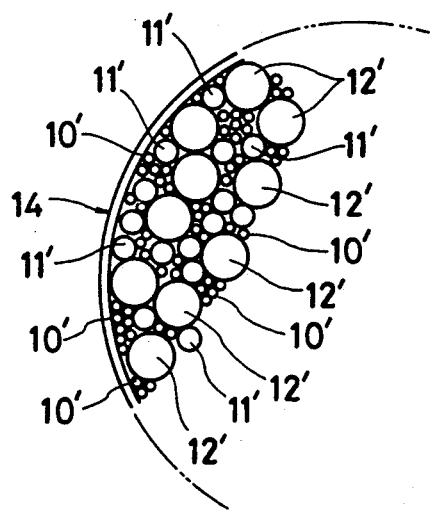
FIG. 5 is a sectional view showing the base material of the image fiber.

FIG. 5 shows another embodiment of an image fiber according to the present invention. The image fiber as shown in FIG. 4 is obtained by a method of fabricating the image fiber which comprises the steps of filling optical fiber strands 10', 10', 10', . . . , 11', 11', 11', . . . , and 12', 12', 12', . . . of more than two different diameters in a glass pipe 14, then collapsing by heating the pipe 14 filled with the optical fiber strands, or drawing the pipe without through the collapsing step in heating state.

In this case, the ratio of the optical fiber strands 10', 10', 10', . . . (similarly 11', 11', 11', . . . and 12', 12', 12', . . . ) of one type of diameter in relation to the entire number of pieces may be more than 30%, and the difference in diameter of the strands (10' and 11', 11' and 12')

having the closest diameters may be set at more than 5%.

In the image fiber thus obtained by mixing and disposing the optical fiber strands of more than two different diameters, the cores are arranged at random in the section, and any moire produced in case of connecting to a TV camera can be accordingly reduced.

In addition, the image fiber thus obtained has no dislocation of the arrangement of the cores, because when the optical fiber strands of more than two different diameters are mixed, the strands are arranged at random.

In other words, even if a small disorder in the arrangement of the cores occurs among adjacent strands in the state that the strands are arranged at random, the strands are rearranged in a new random arrangement, with the result that, since the strands are rearranged from the old random arrangement to the new random arrangement, a visual disorder which causes a dislocation does not occur.

The characteristics of the image fiber according to the present invention when the diameters of the cores are different will be described in comparison with that of the conventional image fiber.

The state of transmitting light in the core generally depends upon the normalized frequency $v$ designated by the following equations in a step index type.

$$V^2 = w(\epsilon_1 - \epsilon_2)\mu_0 a^2 \quad \ldots \quad (1)$$

where
w: Angular frequency of a light to be transmitted
$\epsilon_1, \epsilon_2$: Dielectric constants of the core and the cladding
$\mu_0$: Vacuum magnetic permeability
a: Diameter of core In the above equation (1), the state of the mode excited by the core is represented by the $v$, and the mode is propagated as the wave of phase constant $\beta$ having a function of $v$.

In this case, by considering the coupling of electric power between two cores, the following coupling equation can be obtained.

$$dA/dZ = -\beta a A + K_{ab} B \quad \ldots \quad (2)$$

$$dB/dZ = -\beta b A + K_{ab} B \quad \ldots \quad (3)$$

where
$K_{ab}$: Coupling coefficient (which depends upon the state of the mode and the interval of cores.)
A, B: Amplitudes of transmitting mode in the cores a, b.
$\beta a, \beta b$: Phase constants of the transmitting mode in the cores a, b.
Z: coordinates variables in propagating direction When the equations (2) and (3) are solved, the following answers can be obtained.

(i) In case of $K_{ab} >> (\beta a - \beta b)/2$

Electric power is almost completely converted between cores a and b, the core a is substantially transferred, and the core a has almost completely converted the core b while the light is propagated at a predetermined distance.

(ii) In case of $K_{ab} << (\beta a - \beta b)/2$

No electric power is converted between the cores a and b, and the core a is propagated as it is through the core a.

Since the interval between the cores is short in case of the image fiber, $K_{ab}$ is very large, and the $K_{ab}$ becomes extremely large in the vicinity of the cut-off frequency.

The wavelength to be used is in the range of visible light in the mode of the cut-off frequency, and the range of the wavelength to be transmitted is wide, and this mode should exist in any wavelength in this range.

In the conventional image fiber, the diameter and refractive index difference of the cores are all the same in all the cores, the situation of $\beta a = \beta b$ accordingly exists in one mode, this corresponds to the case of paragraph (i) as hereinbefore described, and the leakage of the light becomes remarkable.

On the other hand, the image fiber of different diameter of the cores according to the present invention has more than two different diameters as described in the range, and the values of $v$ differ between the images of the conventional one and the present invention, becoming $\beta a \neq \beta b$.

In other words, in the image fiber of the present invention, the conditions described in the foregoing paragraph (ii) can be satisfied, thereby greatly reducing the leakage of the light.

Figure 6:
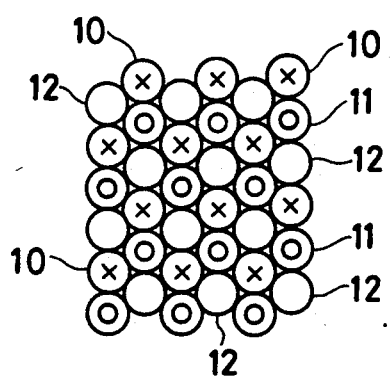
FIG. 6 is a sectional view showing the array of the optical fiber strands to improve the light leakage characteristic.

In order to increase this effect, it is preferred to form the diameters of the adjacent cores different from each other in the image fiber, and in order to form the different diameters of the adjacent cores, at least three types of optical fiber strands 10', 10', 10', ..., 11', 11', 11', ... ., and 12', 12', 12' are employed so that the cores of the same diameter are not disposed adjacent to each other in the array as shown in FIG. 6 and are drawn by the means described.

In view of the leakage of light, the difference of the diameters of the cores of different diameters in the image fiber is found to be more than 5%. If the difference of the diameters of the cores is larger than required, the resolution of the image at the core having a large diameter decreases, and in case of considering the remedy against this drawback and the arrangement of the strands at the fabricating time, the difference of the cores of the different diameters is found to be set to the range as below:

$$0.7 \leq d\ \text{min.}/d\ \text{max.} \leq 0.9$$

where
d min: the diameter of the minimum core
d max: the diameter of the maximum core Example of the present invention will be described:

EXAMPLE 1

5,000 pieces of optical fiber strands, each strand having a diameter of 275 μm of diameter each core leaving a diameter of and each strand having a diameter of 200 μm, and 5,000 pieces of optical fiber strands, each strand having a diameter of 325 μm and each core having a diameter of 200 μm were mixed, the mixture was then densely filled in a quartz tube, and an image fiber was then fabricated according to the usual method.

Since this image fiber is fabricated by mixing the optical fibers of more than two different diameters and arranging the mixture, it does not have any dislocation, and when the respective optical fiber strands were densely filled in the quartz tube, the strands could be densely filled, and were arranged stably at random, thereby eliminating a pinhole leakage and enabling the transmission of a preferable image.

EXAMPLE 2

1,000 pieces of optical fiber strands, each having ⅔ of ratio of core diameter/strand diameter and each strand having a diameter of 400 μm of, and 2,000 pieces of optical fiber strands, each strand having a diameter of 300 μm were densely filled in a quartz tube, and an image fiber was fabricated according to the usual method.

In case of this image fiber, the array of picture elements (cores) was at random, no dislocation nor defect of chrysanthemum pattern was observed, and the improvement from the conventional image fiber could be confirmed.

However, since the number of picture elements (cores) were less like 3,000 pieces, the decrease in the quality of a picture was observed.

EXAMPLE 3

5,000 pieces of optical fiber strands, each strand having a diameter of 275 μm and each core having a diameter of 183 μm, and 5,000 pieces of optical fiber strands, each strand having a diameter of 325 μm and each core having a diameter of 216 μm were mixed, the mixture was densely filled in a quartz tube, and an image fiber was fabricated according to the usual method.

EXAMPLE 4

3,400 pieces of optical fiber strands, each strand having a diameter of 275 μm and each core having a diameter of 183 μm strand having a diameter of also 3,400 pieces of optical fiber strands, each strand having a diameter of 300 μm, and each core having a diameter of 200 μm; and, 3,400 strand pieces each strand having a diameter of 325 μm and each core having a diameter of 216 μm were mixed, the mixture was densely filled in a quartz tube, and an image fiber was fabricated according to the usual method.

No dislocation nor defect of chrysanthemum pattern was observed in the same manner as in Example 2 in the image fibers of the Examples 3 and 4.

EXAMPLE 5

3,400 pieces of optical fiber strands, each strand having a diameter of 270 μm, and each core having a diameter of 180 μm; 3,400 pieces of optical fiber strands, each strand having a diameter of 300 μm, and each core having a diameter of 200 μm; and 3,400 pieces of optical fiber strands, each strand having a diameter of 330 μm and each core having a diameter of 220 μm were mixed, the mixture was filled in a quartz tube to produce a predetermined base material and the material was treated to fabricate an image according to the usual method.

No pinhole which is caused by the mixing of the picture elements (cores) and the defect of a chrysanthenum pattern was observed and the crosstalk characteristics were excellent in the image fiber fabricated in Example 5 as compared with that fabricated in Example 4.

The conditions that more than two types of the core diameters are included when image fiber having the cores of different diameters is fabricated are satisfied, the optical fiber strands in which the ratio of the core diameter to the optical fiber strand diameter is constant may be used, the optical fiber strands having constant thicknesses of all claddings may be used, and the optical fiber strands in which the core diameter, the ratios of the core diameter to the optical fiber strand diameter and the thickness of the claddings are different from each other may be used.

According to the image fiber produced by the method of the present invention as described, a number of cores are advantageously arranged at random, and the cores are covered with integrated cladding. Accordingly, no dislocation of core arrangement nor pinhole can be observed in the section of the image fiber by the random arrangement of the cores.

Further, the image fiber fabricated by the method of present invention has more than two different diameters of the cores. Accordingly, the leakage of the light can be reduced, thereby obtaining an image of preferable contrast, uniform quality of picture by the random arrangement of the cores, and a moire does not occur even when connected to a TV camera.

According to the method of the present invention, the optical fiber strands having more than two different diameters of strands are advantageously assembled when the base material for the image fiber is produced by assembling a number of optical fiber strands in the longitudinally drawing and aligned state. Therefore, in the case of fabrication, the optical fiber strands can be densely filled in a quartz tube, and the image fiber having no dislocation nor pinhole can be easily produced.

What is claimed is:

1. A method of making an image fiber base material used to transmit an image, consisting of the steps of
    (1) longitudinally assembling in a non-uniform distribution thousands of first and second sets of optical fiber strands, these two sets of strands having a cross-sectional diameter of at least two different sizes, wherein the strands of the first set are of the order of 30% or more of the total number of strands and the difference in diameter between the two sets of strands is of the order of at least 5%;
    (2) longitudinally inserting the strands into a hollow glass pipe; and,
    (3) collapsing the pipe about the strands.

2. A method as claimed in claim 1 wherein the pipe is collapsed by heating the pipe and drawing the pipe.

3. A method as claimed in claim 1, each strand having a core of smaller diameter than the strand, one set of strands having a diameter of the order of 270 μm with cores of the order of 180 μm, the other set having a diameter of the order of 300 μm with cores of the order of 200 μm in diameter.

4. An image fiber base material consisting of thousands of first and second sets of longitudinally, fiber strands, assembled in a non-uniform distribution the first set having a cross-sectional diameter of the order of 270 μm, the second set having a cross-sectional diameter of the order of 300 μm, the diameter of the two sets differing by at least about 5%, said strands being encased in a collapsed longitudinal glass pipe.

* * * * *